(12) United States Patent
Romanik et al.

(10) Patent No.: US 10,210,427 B2
(45) Date of Patent: Feb. 19, 2019

(54) SYSTEMS, METHODS, AND DEVICES FOR IMAGE MATCHING AND OBJECT RECOGNITION IN IMAGES

(71) Applicant: Slyce Acquisition Inc., Philadelphia, PA (US)

(72) Inventors: Philip B. Romanik, West Haven, CT (US); Neil Lawrence Mayle, Cambridge, MA (US)

(73) Assignee: Slyce Acquisition Inc., Philadelphia, PA (US)

(*) Notice: Subject to any disclaimer, the term of this patent is extended or adjusted under 35 U.S.C. 154(b) by 0 days.

(21) Appl. No.: 14/745,353

(22) Filed: Jun. 19, 2015

(65) Prior Publication Data

US 2016/0012311 A1    Jan. 14, 2016

Related U.S. Application Data

(60) Provisional application No. 62/022,592, filed on Jul. 9, 2014.

(51) Int. Cl.
| | | |
|---|---|---|
| *G06K 9/62* | (2006.01) | |
| *G06T 3/00* | (2006.01) | |
| *G06T 3/20* | (2006.01) | |
| *G06K 9/46* | (2006.01) | |

(52) U.S. Cl.
CPC ......... *G06K 9/6203* (2013.01); *G06K 9/4671* (2013.01); *G06K 2009/6213* (2013.01)

(58) Field of Classification Search
CPC .............. G06K 9/4671; G06K 9/6211; G06K 2209/25; G06K 9/00; G06K 9/00208; G06K 9/46; G06K 9/6269; G06K 9/685; G06K 2009/6213; G06K 9/00288; G06K 9/00993; G06K 9/325; G06K 9/4633; G06K 9/6203; G06K 9/6256; G06T 7/0042; G06T 7/0028
See application file for complete search history.

(56) References Cited

U.S. PATENT DOCUMENTS

| | | | | |
|---|---|---|---|---|
| 2008/0199044 A1* | 8/2008 | Tsurumi | ................ | G06T 7/2033 382/103 |
| 2009/0141984 A1* | 6/2009 | Nakamura | ........... | G06K 9/6228 382/201 |
| 2012/0027288 A1* | 2/2012 | Yuan | .................... | G06K 9/6211 382/152 |
| 2012/0076422 A1* | 3/2012 | Yang | .................... | G06K 9/6211 382/201 |
| 2012/0275712 A1* | 11/2012 | Inaba | ................... | G06K 9/6211 382/201 |
| 2014/0052555 A1* | 2/2014 | MacIntosh | ........... | G06Q 20/208 705/23 |

\* cited by examiner

*Primary Examiner* — Kim Vu
*Assistant Examiner* — Michael Vanchy, Jr.
(74) *Attorney, Agent, or Firm* — Pillsbury Winthrop Shaw Pittman LLP

(57) ABSTRACT

An image matching technique locates feature points in a template image such as a logo and then does the same in a test image. Feature points from the template image are then matched to the feature points in the test image. An additional matching technique boosts the number of points that match each other. The additional points improve the match quality and help discriminate true from false positive matches.

34 Claims, 10 Drawing Sheets

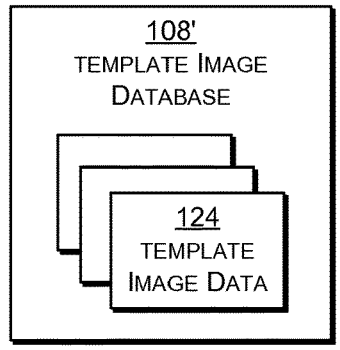
FIG. 2(A)
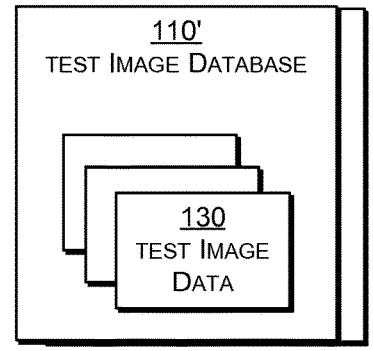
FIG. 2(C)
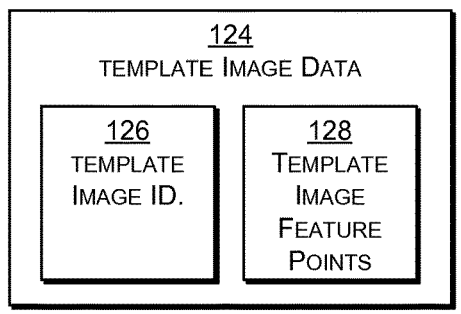
FIG. 2(B)
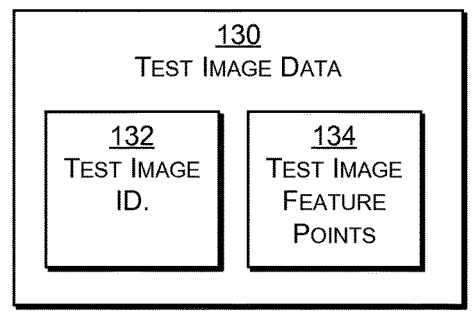
FIG. 2(D)
| IMAGE FEATURE POINTS | | |
|---|---|---|
| INDEX | LOCATION IN IMAGE (POSITION, SCALE, AND ROTATION) | DESCRIPTOR |
| 0 | L0 | D0 |
| 1 | L1 | D1 |
| ⋮ | ⋮ | ⋮ |
| K-1 | $L_{K-1}$ | $D_{K-1}$ |
FIG. 2(E)

| 136 MATCH IMAGE DATA |||
|---|---|---|
| 138<br>TEST IMAGE ID. | 140<br>TEMPLATE ID. | 142<br>MISC. / AUXILARY |
| 148<br>MATCH SET |||

| 148' MATCH SET |||
|---|---|---|
| TEMPLATE POINT | TEST POINT | DISTANCE |
| P1 | P'1 | D1 |
| P2 | P'2 | D2 |
| . | . | . |
| . | . | . |
| . | . | . |
| PN | P'N | DN | ns
SYSTEMS, METHODS, AND DEVICES FOR IMAGE MATCHING AND OBJECT RECOGNITION IN IMAGES

RELATED APPLICATIONS

This application claims the benefit of U.S. Provisional Application No. 62/022,592, filed Jul. 9, 2014, the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to image processing, and, more particularly, to enhanced techniques for image matching and object recognition in images.

BACKGROUND

Image processing techniques exist for trying to determine whether one image is present in another image. More specifically, techniques exist for trying to determine whether one or more objects in one image are present in another image. Such object recognition/identification/location techniques vary in speed and accuracy, but do not scale well to real time and on-the-fly processing of multiple images.

It is desirable to provide object recognition/identification/location image processing techniques that improve the speed and/or accuracy of such techniques. It is further desirable to provide image processing techniques for object recognition/identification/location that support and scale to real-time, on the fly, and batch processing of multiple images.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIGS. 2(a)-2(i) show aspects of databases and data structures used by the system of FIG. 1, according to exemplary embodiments hereof;

DETAILED DESCRIPTION OF THE PRESENTLY PREFERRED EXEMPLARY EMBODIMENTS

Glossary and Abbreviations

As used herein, unless used otherwise, the following terms or abbreviations have the following meanings:

RANSAC refers to RANdom SAmple Consensus;
SIFT means Scale-Invariant Feature Transform;
SURF means Speeded Up Robust Features;
URL means a Uniform Resource Locator; and
a "mechanism" refers to any device(s), process(es), routine(s), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

DESCRIPTION

Figure 1:
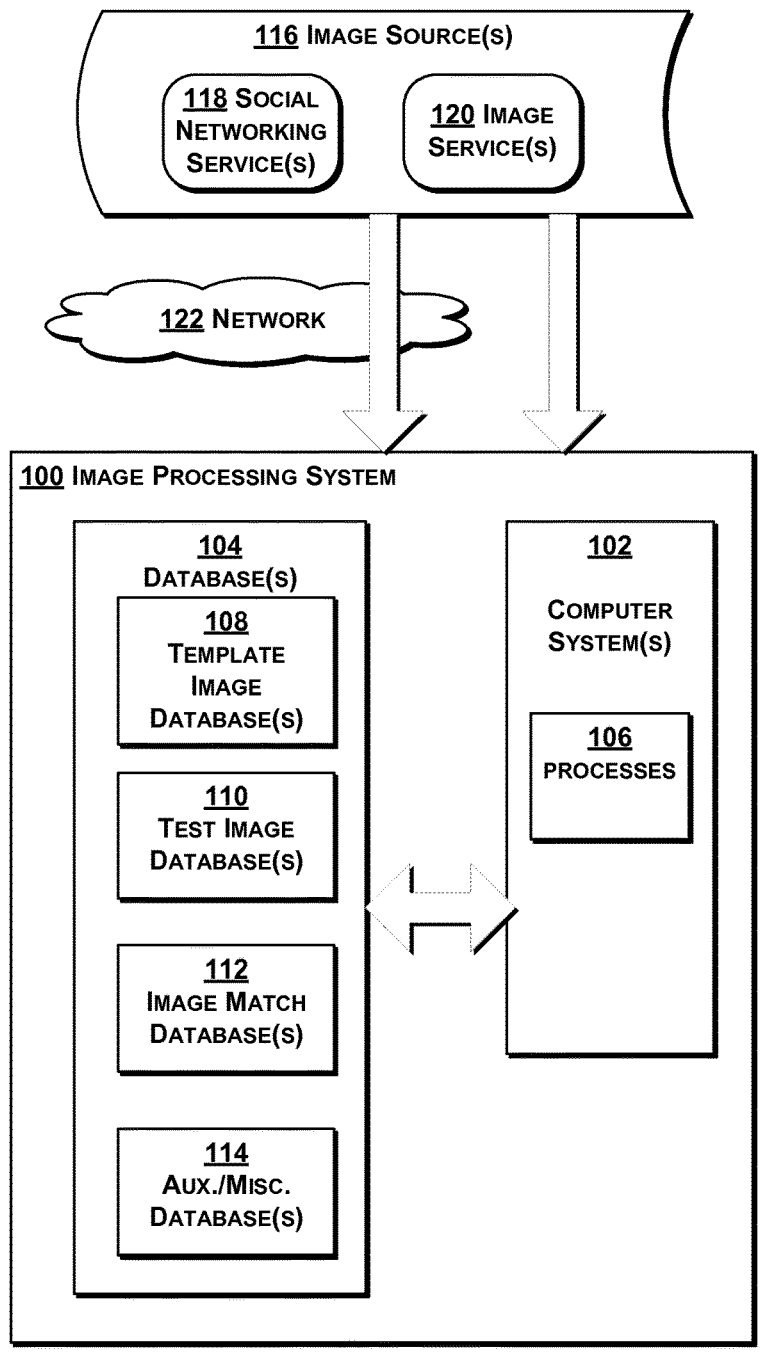
FIG. 1 depicts an overview of a system according to exemplary embodiments hereof.

As shown in FIG. 1, an image processing system 100 according to exemplary embodiments hereof includes one or more computer systems 102 operatively connected to one or more databases 104. Processes 106 running on the computer system(s) 102 interact with the databases 104 as described herein.

The database(s) 104 preferably include one or more template image databases 108, one or more test image databases 110, one or more image match databases 112, and one or more auxiliary/miscellaneous databases 114, each described in greater detail below. The one or more template image databases 108 may also be referred to herein as template image database(s) 108. Similarly, the one or more text image databases 110 may also be referred to herein as text image database(s) 110; and the one or more image match databases 112 may also be referred to herein as image match database(s) 112. The various databases may be implemented in any known manner, including as a file system in an operating system, and the system is not limited by the manner in which any particular database is implemented or maintained or accessed. There is no requirement for the databases to be implemented in the same manner. The database(s) 104 may be co-located with each other and/or with the computer system(s) 102, or they may be remotely located. The database(s) may be distributed.

The image processing system 100 obtains images from one or more image sources 116 (also referred to as image source(s) 116), which may include one or more social networking services 118 (e.g., Facebook, Twitter, and the like) and other image generating or providing services 120. A presently preferred implementation obtains data about images primarily from data providers (or directly from the social media sites) such as GNIP and Datasift, both aggregators of social media data. These aggregators provide the ability to filter social media posts for only the ones mentioning photos and/or other filters for geography, language, inclusion of words, etc., thereby providing an initial pre-filtering step using information (or meta-data) already known about an image. In some cases the retrieval of images (photographs) may be a two-step process in which, first, the system retrieves social media posts, e.g., from the data aggregators, and then the system looks in the data for links to images. As a second step of this process the images (e.g., photos) are retrieved.

In some cases an image source 116 may provide a link (e.g., a URL or the like) to a web page or the like containing one or more images. The image source 116 may have pre-filtered the web pages to include links only those that it considers contain one or more images. The image source 116 may also provide meta-data about the link and/or the webpage. This meta-data may include location and or user information associated with the web pages and/or the images they contain.

The image processing system 100 may obtain the images via a network 122 (e.g., the Internet) and/or in some other manner. It should be appreciated that the image processing system 100 may obtain images from different image sources in different manners.

With reference now to FIG. 2(*a*), an exemplary template image database 108' may contain template image data 124 for multiple template images. As used herein, a template image refers to an image that is to be looked for, in whole or in part, in other images. A template image may be or comprise any image, including one or more of: a logo, a face, textual information, etc. A template image may be fully or partially machine generated. The system is not limited by the content of template images or the way in which they are generated, obtained, or stored.

The template image data 124 for a particular template image may be generated in an offline process, as shown, e.g., in FIG. 3(*a*), in which a template image 300 is processed by an initial setup mechanism 302 to produce template image data 124 corresponding to the template image 300. Preferably each template image is uniquely identifiable within the system, and, as shown in FIG. 2(*b*), exemplary template image data 124 may include or comprise a template image identifier 126 and template image feature points 128 (e.g., generated by the initial setup mechanism 302). A copy of each template image is preferably maintained in database(s) 104, preferably in template image database(s) 108, and each template image is preferably accessible in the database(s) 104 using its corresponding template image identifier 126.

Features are locations within an image that can be used by a matching algorithm to try to find instances of a template image in a test image. The features may also include a description of the image at or near that point. Feature points are preferably picked in such a way that the equivalent locations will also be picked if the image is transformed in various ways (e.g., lighting changed, rotated, scaled, tilted). The feature descriptors are preferably designed to be invariant across a various transformations to the image.

As shown in FIGS. 2(*c*)-2(*d*), an exemplary test image database 110' contains test image data 130 for multiple test images. As noted above, test images may be obtained, e.g., from image source(s) 116. Once obtained by the system 100 images are preferably assigned a unique test image identifier 132 and are stored in test image data 130 the test image database(s) 110 associated with the test image identifier 132. It should be appreciated that it is preferable to store a copy of the test image in the test image database(s) 110. Once a test image has been processed (as described in greater detail herein), the test image data 130 associated with the test image may include test image feature points 134.

The image feature points (template image feature points 128, FIG. 2(*b*) and test image feature points 134, FIG. 2(*d*)) may be stored in an image feature points structure, such as the exemplary logical structure shown in FIG. 2(*e*). Assuming there are k image feature points for a particular image, the logical structure includes an index (0 to k−1) for the feature point, a location (e.g. position (x, y), scale, rotation) in the image associated with the feature point, and a descriptor of the feature point. The form of the descriptor will depend on the feature extraction algorithm used, as described in greater detail below. In a present implementation the feature descriptors are SIFT descriptors. Those of ordinary skill in the art will realize and appreciate, upon reading this description, that different and/or other descriptors may be used. For example, the feature descriptors may be SURF or PCA-SIFT or GLOH descriptors. PCA-SIFT is described, e.g., in Yan Ke and Rahul Sukthankar. 2004. PCA-SIFT: a more distinctive representation for local image descriptors," in Proc. of the 2004 IEEE Computer Society Conference on Computer vision and pattern recognition (CVPR'04). IEEE Computer Society, Washington, D.C., USA, 506-513, the entire contents of which are hereby fully incorporated herein by reference for all purposes. GLOH descriptors are described, e.g., in Krystian Mikolajczyk and Cordelia Schmid "A performance evaluation of local descriptors", IEEE Transactions on Pattern Analysis and Machine Intelligence, 10, 27, pp. 1615-1630, 2005, the entire contents of which are hereby fully incorporated herein by reference for all purposes. SURF descriptors are described, e.g., in Herbert Bay, Andreas Ess, Tinne Tuytelaars, Luc Van Gool, "SURF: Speeded Up Robust Features", Computer Vision and Image Understanding (CVIU), Vol. 110, No. 3, pp. 346-359, 2008, the entire contents of which are hereby fully incorporated herein by reference for all purposes. Feature descriptors are described in Fischer, P. et al, "Descriptor Matching with Convolutional Neural Networks: a Comparison to SIFT," the entire contents of which are hereby fully incorporated herein by reference for all purposes.

It should be appreciated, that the template image data 124 may be determined or derived from more than one template image or from more than one version of a template image (e.g., from scaled versions, etc.). Those of ordinary skill in the art will therefore realize and appreciate, upon reading this description, that a set of feature points that may be derived from other than one template image and from a process other than feature detection. Accordingly, it should be appreciated that template image data 124 in a template image database 108 may have been determined or derived from more than one template image (e.g., from variations or versions of a template image), and furthermore, that there may not be any single template image that contains all of the feature points associated with a particular template image.

In a presently preferred exemplary implementation the features are detected using a Lapacian across the whole image producing one set of features for the whole image. Those of ordinary skill in the art will realize and appreciate, upon reading this description, that different and/or other approaches to feature detection may be used. For example, in some alternate approaches features may detected using SIFT or MSER, or feature sets may be found for interesting regions of the test image and each region can be matched separately.

Feature detection may find hundreds of features for the template image and similarly, hundreds of features for the test image.

Those of ordinary skill in the art will realize and appreciate, upon reading this description, that any data structures shown herein are merely examples, and that different and/or other data structures and organizations may be used.

FIG. 2(*f*) shows an exemplary image match database 112' containing match image data 136 for one or more (preferably multiple) images.

As shown in FIG. 3(*b*), in operation, the image processing system 100 may process a single test image 306 (at 304) with respect to particular template image data 124 to determine whether or not the template image corresponding to the template image data 124 is present in the single test image 306. If a match is found, i.e., if the process single image mechanism 304 determines with sufficient certainty that the template image corresponding to template image data 124 is present in the image 306, then the process produces image-matching results 308. The image matching results 308 may include an indication of where the template image is located in the single image 306 and may also include other information about the match. The image matching results 126 may be stored in match image data records 136 in the match database(s) 112.

Matching is done between features of the template images and the features of the test image, and the matching process finds feature points that correspond between the two images. Two feature points correspond/match if the descriptions of the two feature points are similar enough. A similarity measure (e.g., a distance) is used between the two points and if the distance is within some limit the two feature points are considered matches. The results of the matching process between a template image and a test image is a set of pairs of feature points called the match set. The first element of the pair is a feature of the template image and the second element of the pair is a feature of the test image. Associated with each pair of features is a measure of the similarity of the two features.

Figures 2F, 2G, 2H:
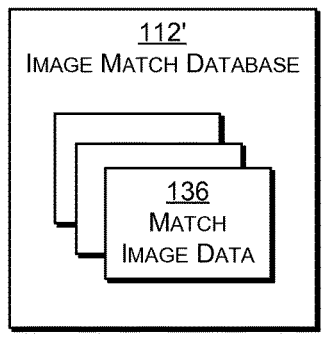
Figure 2I:
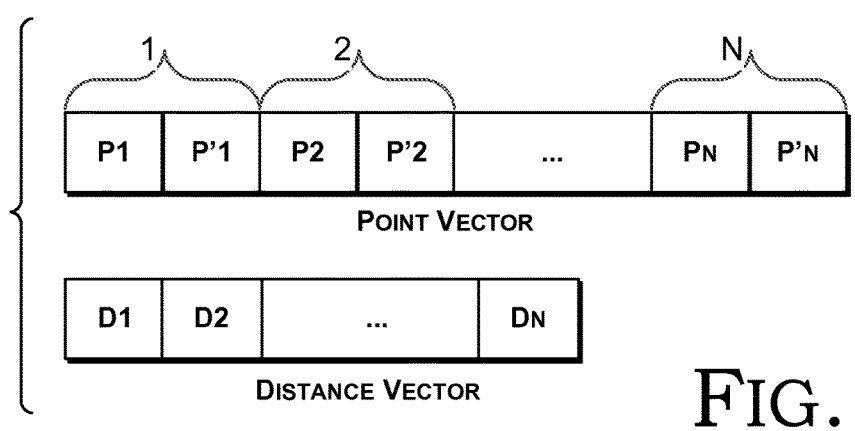

In presently preferred exemplary embodiments hereof, as shown e.g., in FIG. 2(g), the match image data 136 may include: (i) a test image identifier 138 (corresponding to the unique identifier of the matched test image in the system); (ii) a template image identifier 140 (corresponding to the unique identifier of the matched template image in the system); (iii) miscellaneous/auxiliary information 142; and (iv) a match set 148. An exemplary match set (which may be part of the match image data 136) preferably includes a list of matched points from the template image and the test image, along with the distance between them. Thus, e.g., the exemplary match set 148' in FIG. 2(h) includes N matches $(P_1, P'_1), (P_2, P'_2), \ldots (P_N, P'_N)$, with corresponding distances $D_1, D_2, \ldots, D_N$. In this example, according to the matching algorithm, point $P_i$ in the template image matches or corresponds to point $P'_i$ in the test image, for i=1 to N, where $D_i$ is a distance for points $P_i$ (in the template image) and $P'_i$ (in the test image). In some implementations a match set 148 may be stored as a point vector comprising pairs of matched points along with a distance vector of the corresponding distances, e.g., as shown in FIG. 2(i).

Figure 3A:
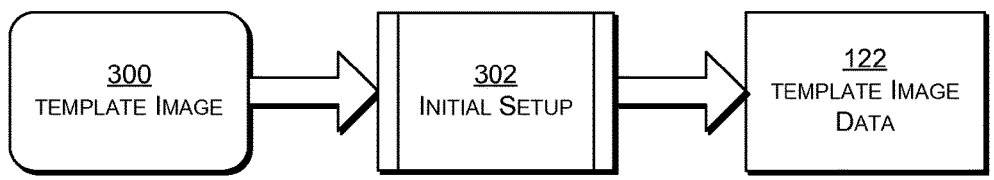
FIGS. 3(a)-3(e) show exemplary processing in the system of FIG. 1, according to exemplary embodiments hereof.
Figure 3B:
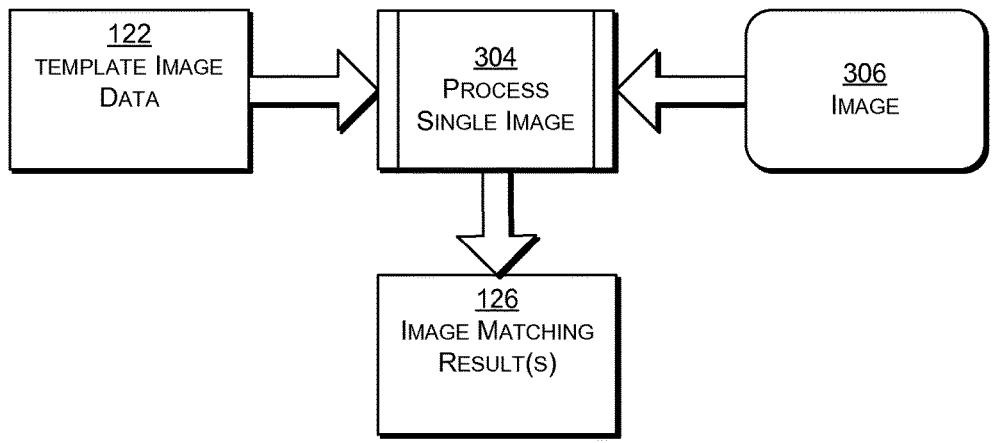

As shown in FIG. 3(b), the mechanism 304 attempts to match a single template image with a single test image. However, in operation, a system 100 may attempt to match a particular test image with multiple template images, as shown, e.g., in FIG. 3(c). The mechanism 304 (to process a single test image with respect to a single template image) may thus be invoked repeatedly for multiple template images whose template image data 124 are stored in the template image database(s) 108. In some exemplary embodiments the routine 304 may terminate when a match is found for a template image. In other embodiments the mechanism 304 may continue to look for other matches (e.g., with other template images) even after a match is found.

As shown above with reference to FIG. 1, image-processing system 100 may obtain test images from image source(s) 114. These test images may be obtained in a batch format and/or as one or more streams of images 310. E.g., there may be a stream of images corresponding to each image source. With reference to FIGS. 3(d)-3(e), the process image stream (s) mechanism 308 processes the images 306 in image stream(s) 310 (from the image source(s) 114) to determine whether one or more template images match images in the image stream(s) 310. In some embodiments this process may be implemented by repeatedly invoking the process single image mechanism 304 for images in the image stream(s) to determine whether any template images match the image stream images. Those of ordinary skill in the art will realize and appreciate, upon reading this description, that multiple test images may be processed in parallel on one or more processors and/or computer systems (e.g., in a distributed system). Additionally, the processing of a single image (304) may occur on multiple processors and/or computer systems. Although various processes are shown in series in some of the diagrams, it should be appreciated that some or all of the processes may be performed concurrently.

The mechanisms (process single image, process image stream(s), etc.) may correspond to processes 106 running on the computer system(s) 102.

In real-world systems, the image streams may contain millions of images, produced at a rate exceeding 2 million images per day (about 1,400 images per minute).

Processing a Single Image

Figure 3C:
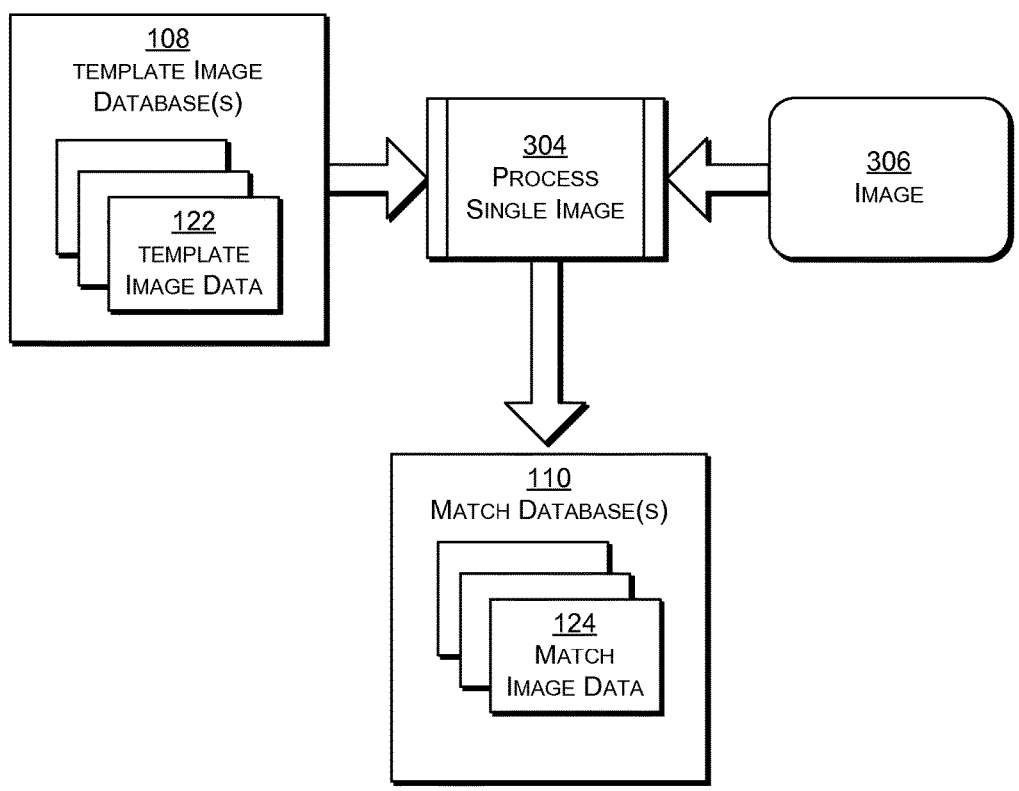
Figure 3D:
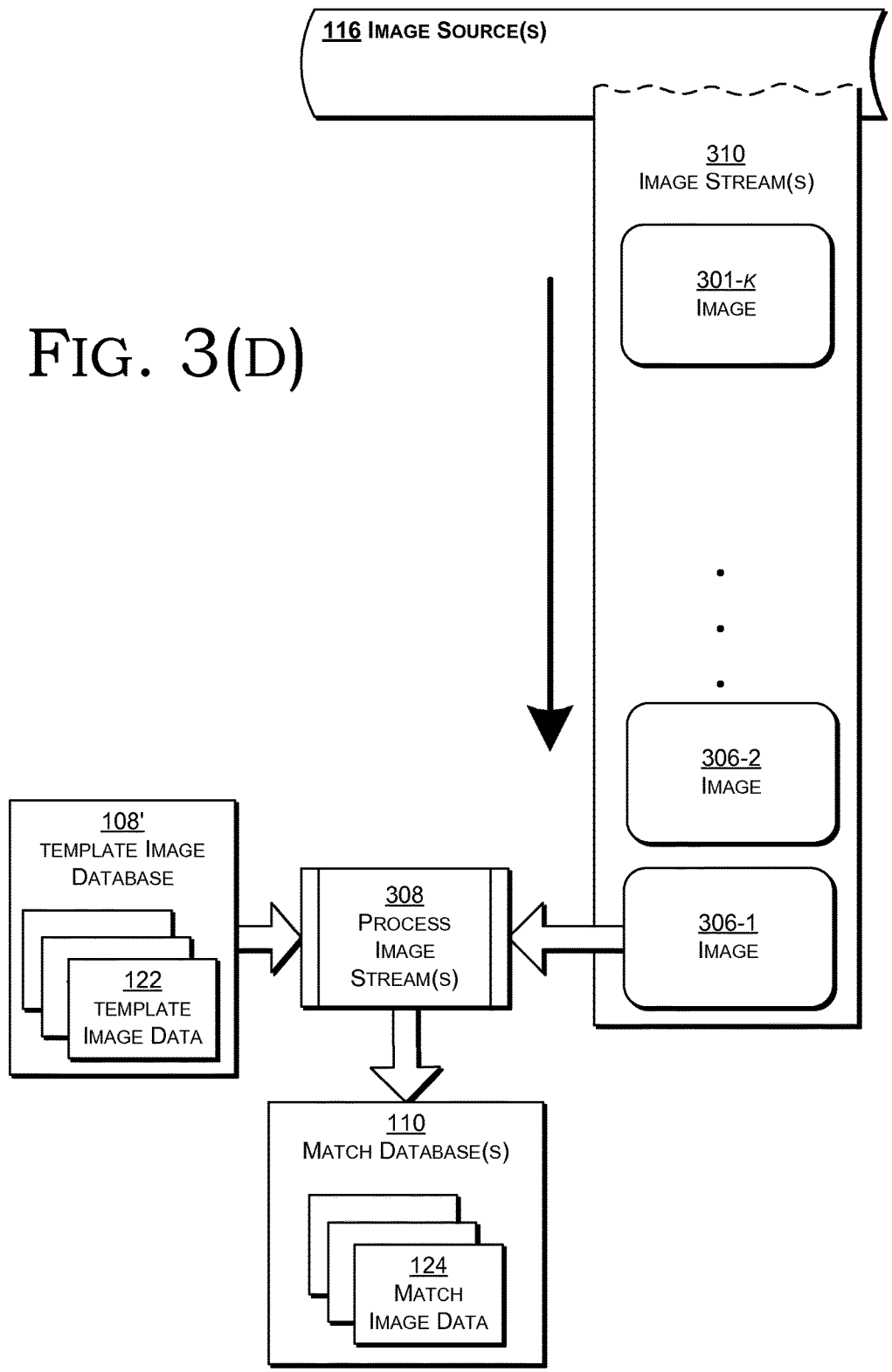
Figure 3E:
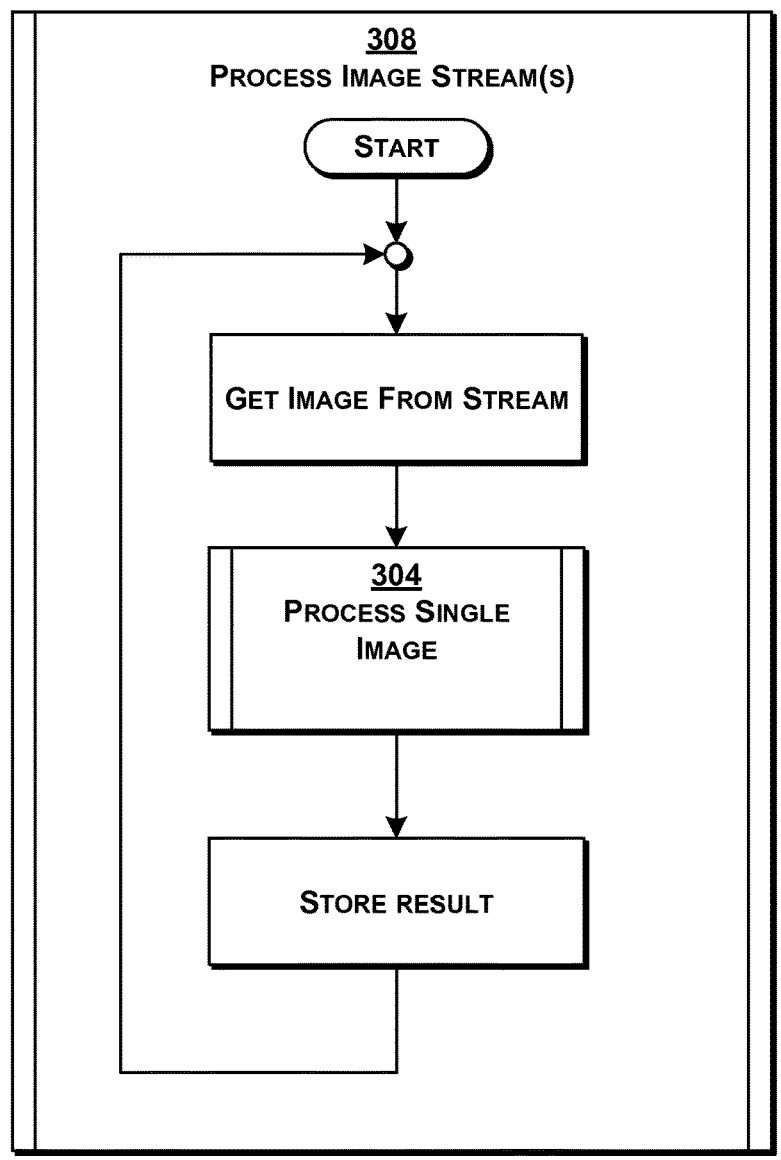

An exemplary mechanism to process a single image (corresponding to 304 in FIGS. 3(b) and 3(c)) is described in David G. Lowe. 2004. Distinctive Image Features from Scale-Invariant Keypoints. Int. J. Comput. Vision 60, 2 (November 2004), 91-110, hereinafter "Lowe", and in U.S. Pat. No. 6,711,293, to Lowe, the entire contents of both of which are hereby fully incorporated herein by reference for all purposes. Lowe's technique (sometimes referred to as SIFT) does not scale efficiently to large numbers of images in the input image stream(s) or to large numbers of template images in the template image database(s). In addition, Lowe's technique does not provide the sensitivity and precision needed by the overall process of find branded material in social media images.

An image may be decomposed into a number of feature points to describe the visual content of the image. Feature points may be generated at predetermined locations (i.e., at a certain position, and radius) in an image, or computed from features found in an image. When feature points are chosen that are invariant to change (such as to translation or rotation), these feature points may be used to determine whether two images are related to each other. Region-oriented methods can also be used to generate feature points (ex: mid-level features from convolutional neural networks).

For example, if two photographs are taken of the same scene from slightly different vantage points, each image will contain similar features in the overlap region between the images. When the feature points from each image are compared, it is possible to determine if the two images are related, and the coordinate transformation of how they are related.

Feature point matching may also be used to see if a template is found in an arbitrary image. A template may be a real or an artificial image that expresses a pattern to be found in the image. The template may be any image, including a computer generated brand logo. In this case, the matching operation can determine if the brand logo is present in a second image, and if so, where in the second image the brand logo is located.

Matching a template against an image generally includes a number of steps, namely:
1. Feature point extraction from the template image.
2. Feature point extraction from a test image.
3. Match feature points from template image with feature points in a test image.
4. Match feature points in a test image with the feature points from the template image.
5. Eliminate non-symmetrical matches.

6. Compute the best image transformation between the matching points.
7. Determine if the template image is present in the test image.

Feature Point Extraction

There are many feature detectors that may be used to implement the feature point extraction of the first two steps, including ones such as SIFT (Scale-Invariant Feature Transform), and SURF (Speeded Up Robust Features) that can detect features which are scale and rotationally invariant.

Feature point extraction from an image consists of two steps. The first step is to determine positions in the image that are stable (i.e., that do not move) over small and moderate amounts of image transformation such as scale and rotation. These locations define so-called keypoints in the image. A keypoint describes a two-dimensional (2D) location (e.g., (x, y) coordinates) and the angle (or orientation) of the feature (SIFT keypoints specify a 2D location, scale, and orientation).

The second step of feature point extraction is to extract a so-called descriptor (e.g., a numeric signature) from each feature point. For example, an implementation of the SIFT descriptor has 128 values that encapsulate the orientations in a region that surrounds the keypoint. Numeric descriptor values are often normalized such that the descriptor is of unit length. This normalization improves the descriptors invariance to illumination changes.

It should be appreciated that steps 1 and 2 generally differ as to when the feature point extraction is computed. Typically the template image is known in advance and the feature point information can be constructed beforehand. Feature point extraction of a test image may be computed when the image is analyzed, and compared with the previously computed information from the template image. In addition, in some cases a user now wants to look for a new template/brand in a large library/database of images from social media. In those cases the test images are known beforehand and the system may want to store the feature points and descriptors for that set of test images.

Matching Feature Points

The third and fourth steps match (or attempt to match) feature points from one image to feature points from another image. This matching may be accomplished, e.g., by computing the nearest neighbors of each descriptor from a first image to descriptors in a second image. Descriptors come in many varieties ranging from binary (one-bit of information) to numeric for each element in the descriptor. For numeric descriptors, the nearest neighbors may be determined by the descriptors with the shortest distance. Although many distance formulas can be used, the L2 (Euclidean) distance is preferred. For each descriptor in one image, the closest matches (usually two) from the second image are computed.

Lowe describes a ratio test that computes the ratio of the smallest distance from a keypoint in a first image to a keypoint in a second image, to the second smallest distance from the same keypoint in the first image to a second keypoint in the second image. A large ratio (Lowe used a threshold of 0.8) may be used to indicate that two keypoints in the second image are similar to the keypoint in the first image. When this condition arises, the similar points are removed from further matching to reduce mismatches between keypoints. (Other algorithms may salvage these points.) This process is carried out by comparing every keypoint in one image to the keypoints in the second image.

The third and fourth steps differ in the direction of matching. In the third step the keypoints from the template image are compared with the keypoints in the test image. In the fourth step the keypoints in the test image are compared with the keypoints in the template image.

Eliminating Non-Symmetrical Matches

The fifth step enforces a constraint that the best matching points between a first image and a second image should be the best matching points between the second image and the first image. This symmetric matching step discards the matches found in the third and fourth step if the best matches do not refer to each other.

It should be appreciated that eliminating non-symmetrical matches is essentially a filtering process, and those of ordinary skill in the art will realize and appreciate, upon reading this description, that different and/or other filtering processes may be used. In some cases the elimination of non-symmetrical matches may lose actual matches. For example, if a template image contains two of the same letters, then the feature points for these letters may both be the nearly the same (other than location) and thus there may be near duplicates of several feature points. For example, if we have feature point T and T', the match to the image the best match for T may be the feature point I in the image, but the best match for I in the image may be T'. Using a filter that eliminates non-symmetrical matches would eliminate this match, whereas keeping them in gives rise to combinatorics issues (how to decide the right pairing). The subsequent boosting (described below) is expected to re-establish some of these matches. It should be appreciated, however, that if too few points to match, then the match may be lost entirely by eliminating the non-symmetric points.

Other algorithms at the matching stage to deal with non-symmetric cases.

Computing the Best Image Transformation Between the Matching Points

The sixth step takes as input the keypoints from the template image that match the keypoints in the test image, and computes a geometric relationship between the points in each image. Many different methods can be employed to determine these relationships, including using a Hough transform (see, e.g., Lowe), affine transformation, or homography. A homography computes the projective transform to describe the relationship between two coordinate systems. The points determined from the fifth step do not necessarily share the same geometric transformation. One reason is that the points come from different, non-related, portions of the image. Another reason is that points belong to related objects, but the objects are grossly distorted. The RANSAC (RANdom SAmple Consensus) algorithm may be employed to find the best subset of matching points to compute the best transformation between two images. The RANSAC algorithm is described in Fischler, M. A., et al (June 1981), "Random Sample Consensus: A Paradigm for Model Fitting with Applications to Image Analysis and Automated Cartography". Comm. of the ACM 24 (6): 381-395, the entire contents of which are hereby fully incorporated herein by reference for all purposes.

Determining if the Template Image is Present in the Test Image

The seventh step identifies whether the template image is present anywhere in the test image. The result of the sixth step is either:

(i) no homography (insufficient matching points exist between the template image and test image),
(ii) an incorrect homography, or
(iii) a valid homography.

An invalid homography is one in which the matching points between the template image and test image returns a mathematically valid result, but one which is impossible in the natural world. Invalid homographies are treated as though no homography was computed.

A valid homography is used to establish the coordinate system relationship between points in the template image with the points in the test image. However, the homography might be valid only over a small region of the image, rather than over the entire area of the template image. In some cases this is acceptable if the template in the test image is obscured or distorted. In other cases, the matching region may be small because the template image is not found in the test image. For example, a portion of a letter in the template image may match the corresponding letter in the test image. This does not mean that the template image is present in the test image, only that they share a small common region. One common method to determine if the template image is present in the test image is to define a minimum overlap size between the template image and test image. A match between the template image and test image is returned only if the overlap area exceeds this threshold.

Boosting the Number of Matching Points

The process of matching features from a first image and a second image typically discards a significant number of feature points, often because of feature similarity, image distortion, or obscured features. For some applications of feature matching, such as stitching two similar images together to form a single, registered image, the discarded feature points do not cause a problem because of the large number of overlapping feature points in the two images. However, for applications such as matching features from a template image to a test image, the discarded feature points may cause many undesirable issues. One issue may be computing an accurate mathematical transformation between the coordinate system of the template image and the coordinate system of the test image. The error of a transformation matrix is often expressed in terms of a total, or average, reprojection error, where the reprojection error is a point-wise computation of the error between the computed location of a feature point and its actual location. The reprojection error is usually smaller when more points are available to compute the image transformation matrix.

An individual point match between a feature point in a first image and a feature point in a second image can be characterized as belonging to one of three classes:

The feature point identifies the same object in both images, and matches the predicted location of the feature points closely. If a test image contains a pristine copy of the template image, the error in location can be expressed as fractions of a pixel. When the test image is less than pristine (e.g., highly skewed or distorted), the location error can be 1-3 pixels.

The feature point identifies the same object in both images, and the predicted match location is not accurate. A common source of error is distortion of the template image in the test image.

The feature point match is not correct, and there is no match between a template image and a test image.

The most accurate transformation matrix between a template image and a test image is found by using only feature points that correctly and accurately locates the points in both images.

Accordingly, in some aspects hereof, only the best matching feature points between the template image and a test image are used to establish the coordinate transformation between the two images. An initial homography is determined using a large reprojection error threshold, e.g., using the RANSAC algorithm. If a sufficient number of matching points (e.g., ≥6 points) are found between the template image and test image, additional homography estimates are computed using a smaller reprojection error threshold. When fewer points are used as input, a correct homography can often be computed that has a smaller reprojection error when computed with more points. One advantage of using a more accurate homography to describe the relationship between a template image and test image is to compute additional statistics on the match, such as a correlation coefficient to describe the similarity between the two matching regions.

Matching feature points between a template image and a test image may signal a weak match between the two images. The more points that match between a template image and a test image, the greater the chances that the test image contains the template image. The process of boosting the matching points begins by transforming the test image feature points into the coordinate system of the template image. It should be appreciated that the template image only contains the features belong to the template, so running a transformation in this direction causes non-template feature points in the test image to be discarded because they are outside the field of view in the transformed image. When the two images are in the same coordinate system, the individual feature points in the template image can be compared to the feature points in the transformed test image. This comparison uses both the distance measure of the feature points in addition to the distance measure the of the (x, y) (i.e., a 2D) location of a feature point in the transformed test image with the (x, y) location of a feature point in the template image. When the two distance measures are within a specified distance, these boosted match points are added to the original list of matching points. When the homography is computed using all the match points (i.e., original and boosted), it may contain a larger reprojection error than the homography computed from only the original match points. When this condition arises, the homography used for future computations will either be the homography with the smaller reprojection error, or another improved homography may be computed using the first aspect hereof.

In yet other aspects hereof, a "best" homography may be computed using the first aspect hereof. As with the second aspect hereof described above, the more points that match between a template image and a test image, the greater the chances that the test image contains the template image. In this aspect, the process of boosting the matching points begins by transforming the template image feature points into the coordinate system of the test image. The template image only contains the features belonging to the template, so the transformation usually maps the template image on to a portion of the test image. The region of overlap between the test image and the transformed template image, plus a small padding around it, may be used to identify one or more boosted match points. The comparison between features points from both images uses both the distance measure of the feature points in addition to the distance measure the of the (x, y) (i.e., 2D) location of a feature point in the transformed template image with the (x, y) location of a feature point in the test image. When the two distance measures are within a specified distance, these boosted match points are added to the original list of matching points. When the homography is computed using all the match points (original plus boosted), it may contain a larger reprojection error than the homography computed from only the original match points. When this condition arises, the homography used for future computations will either be the homography with the smaller reprojection error, or another improved homography may be computed using the first aspect hereof.

In yet other aspects hereof, a template image and test image with three or four matching points are considered. While an exact homography using four matching points can be computed, it is often not an actual match between the template image and test image. When three or four matching points are available, a two-dimensional affine transform may be used to relate a template image to a test image. Three matching points is the minimum number of points necessary to construct a six-degree of freedom affine transform. When four points are available, a somewhat better affine transform can be computed by finding the transform with the minimum amount of error. In a similar manner as other aspects hereof described above, a transformation matrix that relates the points in the template image and test image may be used to find additional points that are considered a match. Unlike the other aspects hereof, the goal is to find additional matching points such that a homography can be computed. Using this homography, the homography can be improved using other aspect hereof.

In yet other aspects hereof, a template image and test image with two (2) matching points may be considered. A four-degree of freedom transformation (where the preferred transformation includes x translation, y translation, scale, and rotation) may be computed to find additional points that match between the template image and test image. With the addition of additional points, either an affine transform or homography may be computed, and boosted, using other aspect hereof.

DESCRIPTION

Figure 4:
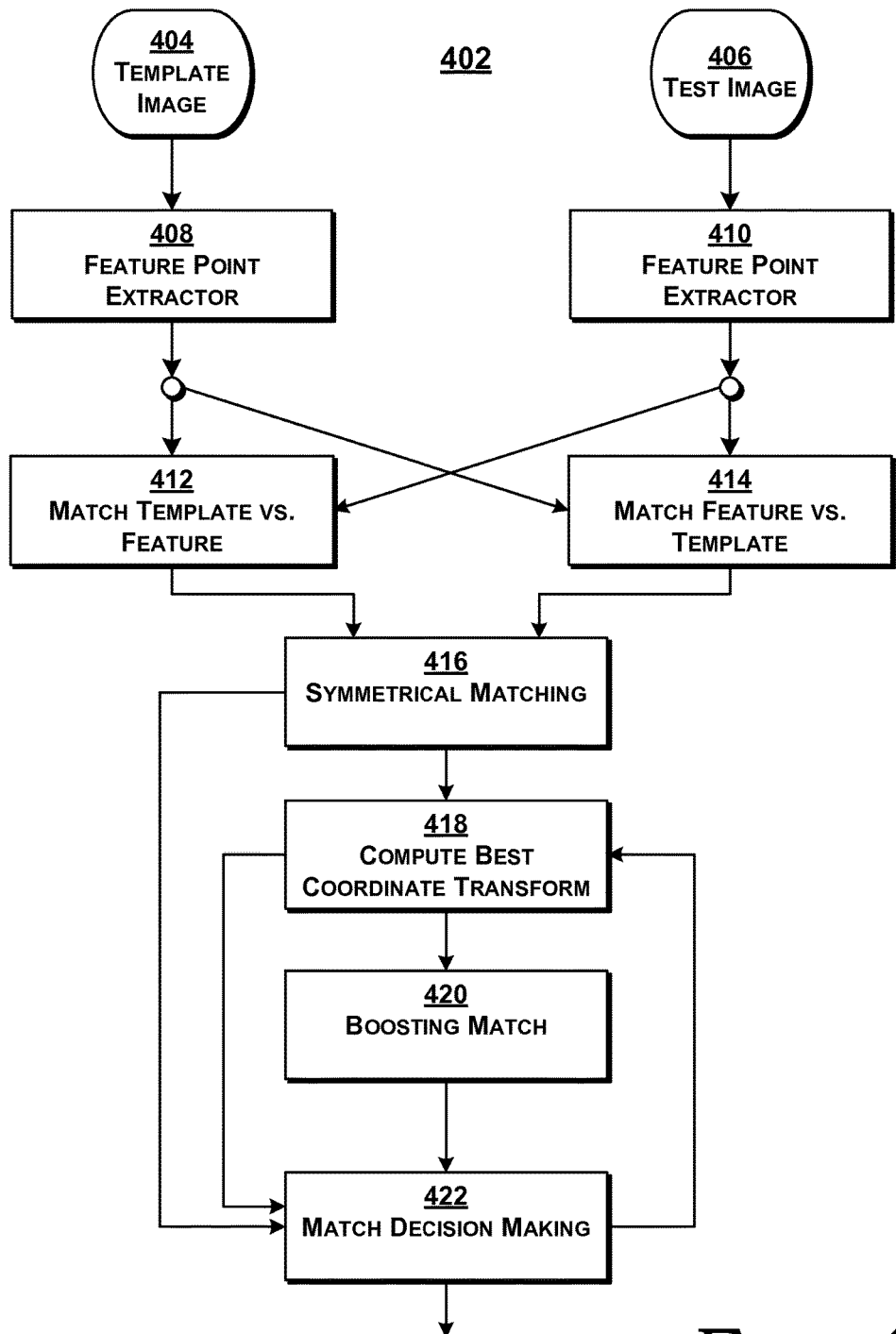
FIG. 4 is a block diagram showing exemplary processing according to exemplary embodiments hereof.

FIG. 4 is a block diagram illustrating a system/framework 402 according to exemplary embodiments hereof of matching a template image 404 to a test image 406. This system 402 may correspond to mechanism 304 ("Process Single Image") in FIGS. 3(b)-3(c). Although FIG. 4 shows the matching between a single template image and a single test image, it should be understood that the system 402 may be used to match any number of template images to any number of test images (e.g., by being invoked multiple times, as shown for Process Single Image 304 in FIG. 3(e)).

Feature point extractor mechanism 408 (hereinafter "feature point extractor 408") extracts feature points from template image 404. The feature points determined by feature point extractor 408 identify locations in the template image that are (or should be) invariant to small changes of lighting condition and image modifications (including, e.g., image translation, image rotation, and image skew). In preferred embodiments hereof, the SIFT algorithm, or a SIFT-like algorithm that produces similar keypoints and feature descriptors, may be used for feature point extraction by feature point extractor mechanism 408. Feature point extraction on the template image 404 may be run before, during, or after feature point extraction of the test image 406, although in preferred embodiments, feature point extraction is pre-computed and required image data are stored (e.g., as JSON data in a local file system). The feature point extraction on the template image 404 corresponds, at least in part, to the initial setup mechanism 302 in FIG. 3(a), where the template image 404 corresponds to the template image 300 in FIG. 3(a), and the output of the feature point extractor 410 corresponds to the template image data 124 in FIG. 3(a).

Feature points are extracted from test image 406 using feature point extractor mechanism 410 (hereinafter "feature point extractor 410"). The feature points produced/determined by feature point extractor 410 identify locations in the template image that are (or should be) invariant to small changes of lighting condition and image modifications (e.g., including, but not limited by, image translation, image rotation, and image skew). Feature point extractor mechanism 410 preferably uses the same algorithm as feature point extractor mechanism 408, although tuning parameters used by them to generate features may differ. In preferred embodiments hereof, the SIFT algorithm, or a SIFT-like algorithm that produces similar keypoints and feature descriptors, may be used for feature point extraction. Feature point extractor mechanism 410 preferably executes for each test image provided to system 402.

Matcher (or matching mechanism) 412 takes the feature points computed by feature point extractor mechanism 408 (from template image 404) and feature point extractor mechanism 410 (from test image 406), and determines candidate feature matches between feature points in template image 404 and feature points in test image 406. Matcher 412 computes the distance between feature points in template image 404 to features points in test image 406. Although any distance measure can be used to compute the distance between two feature descriptors, in preferred embodiments hereof, the L2 distance measure may be used. The matching may use exact (i.e., brute force) methods or approximate matching of the features produced by feature point extractor 408 and feature point extractor 410. In preferred embodiments hereof, exact methods are used to compute the distance between every feature point in template image 404 and every feature point in test image 406.

Matcher (or matching mechanism) 412 may produce/compute a large number of matching points, and generally most matching points are incorrect matches between features in template image 404 and test image 406. Accordingly, a test may be used to prune the set of matching points found by matching mechanism 412. In preferred embodiments hereof, a ratio test is used to discard feature point matches if the ratio of the smallest distance from a feature point in the template image and a feature point in the test image to the second smallest distance of the same feature point in the template image to a second feature point in the test image, exceeds a threshold. The result of applying the ratio test is fewer point matches between the template image 404 and test image 406. Matcher 412 produces the best N matches from a single feature point in template image 404 to many feature points in test image 406. For the ratio test to work appropriately, N should be greater than or equal to 2. When N>2, the ratio test may be applied, but additional matches are retained for use by symmetrical matching 416. In preferred embodiments hereof, N=2 for full-image matching, and N=3 when potential, smaller regions of test image 406 are examined.

Matcher (or matching mechanism) 414 is similar to matcher 412, but takes the feature points computed by feature point extractor 410 (from test image 406) and feature point extractor 408 (from template image 404) and determines candidate feature matches between feature points in test image 406 and feature points in template image 404. Matcher 414 computes the distance between feature points in test image 406 to features points in template image 404. As with matcher 412, any distance measure can be used to compute the distance between two feature descriptors, but preferred embodiments hereof use the L2 distance measure. The matching done by matching mechanism 414 may use exact (e.g., brute force) methods or approximate matching of the features produced by feature point extractor 410 and feature point extractor 408. In preferred embodiments hereof, exact methods are used to compute the distance between every feature point in test image 406 and every feature point in template image 404.

As with matching mechanism 412, a large number of matching points are computed from this process by matching mechanism 414, and most matching points are incorrect matches between features in test image 406 and template image 404. In preferred embodiments hereof, a test such as the ratio test may be used to discard certain feature point matches. E.g., using the ratio test, if the ratio of the smallest distance from a feature point in the test image and a feature point in the template image to the second smallest distance of the same feature point in the test image to a second feature point in the template image, exceeds a threshold. The result of the ratio test is fewer point matches between the test image 406 and template image 404. Matcher 414 produces the best N matches from a single feature point in test image 406 to many feature points in template image 404. For the ratio test to work, N must be greater than or equal to 2. When N>2, the ratio test may be applied, but additional matches are retained for use by symmetrical matching 416. In preferred embodiments hereof, N=2.

Matching features from matching mechanism 412 and matching mechanism 414 are provided to (i.e., input into) symmetrical matching mechanism 416 to identify the best matching features between the template image 404 and test image 406. Symmetrical matching mechanism 416 enforces the constraint that the best matching points between the template image 404 (found by matcher 412) and test image 406 (found by matcher 414) are (or correspond to) the best matching points between the test image 406 and template image 404.

A simple form of symmetrical matching by mechanism 416 matches the best feature points between two images. Consider, e.g., a single feature point FP1 from template image 404 and the best matching feature point FP2 from test image 406. Also consider a single feature point FP3 from test image 406 and the best matching feature point FP4 from template image 404. When FP2=FP3, then the constraint is that FP1 must equal FP4. In other words, the best matching points between two images must point to each other.

A separate, looser constraint can be used when the closest neighbors, N≥2, are considered from the matching points computed by matcher 412 and matcher 414. Consider, e.g., a single feature point FPT1 from template image 404, and the best N matching feature points FP1, FP2, . . . FPN from test image 406. A relaxed symmetry constraint can be used to match feature FPT1 to any feature point FP1, FP2, . . . FPN from test image 404 such that the best matching point from a feature point from test image 404 is the feature point FPT1 from template image 404. Using this looser symmetry constraint will typically produce more matching points between the feature points in template image 404 and test image 406.

The output from symmetrical matching mechanism 416 may be a list of feature point matches (if any) between template image 404 and test image 406. If the number of matching points is below a threshold T, the test image 406 will be labeled (by match decision making mechanism 422) as not a match. In preferred embodiments hereof, the threshold T is 2, when feature point boosting is enabled, or 5 when boosting is disabled.

The list of matching feature points (if any) between template image 404 and test image 406 that is output of symmetrical matching mechanism 416 may be used as input to compute image transform mechanism 418. The type of image transformation computed in image transform mechanism 418 may be dependent upon the number of input points from symmetrical matching mechanism 416 or as feedback from match decision-making mechanism 422. For any image transformation computed between template image 404 and test image 406, a reprojection error may be computed. Given an image transformation function ITF1 $(x, y)$ that transforms an (x, y) point in template image 404 into the coordinate system of test image 406, a feature point FPT1 with image coordinates in template image 404 is transformed into FPT1' with image coordinates in test image 406. If the associated matching point in test image 406 from symmetrical matching mechanism 416 is FP1, the Euclidean distance between FTP1' and FP1 is the reprojection error for one set of matching points. The total reprojection error can be computed by summing the individual reprojection errors for every set of matching points between template image 404 and test image 406. The reprojection error can also be computed in the other direction by transforming feature points in test image 406 into the coordinate system of template image 404.

In some preferred embodiments hereof, a homography may be computed when 5 or more matching feature points are available to image transform 418. A homography takes a minimum of 4 points and computes a 3×3 homography matrix. A minimum of 5 points is preferably used to improve generation of a plausible transformation matrix, rather than a mathematically correct, but implausible matrix.

In some preferred embodiments hereof, a six-degree-of-freedom affine transformation may be computed when 3 or 4 matching feature points are available to image transform 418. The affine transform requires a minimum of 3 matching points so when 4 matching points are available, the affine transformation with minimum reprojection error is computed.

In some preferred embodiments hereof, a four-degree-of-freedom affine transformation may be computed when 2 matching feature points are available to image transform mechanism 418. A number of different types of transforms are possible with four points, but one that computes translation and rotation is computed.

Image transform mechanism 418 may downgrade the type of image transformation to perform in order to reduce the reprojection error. For example, when 6 matching points are available, a homography is usually computed to relate the points in template image 404 with the points in test image 406. If the reprojection error (expressed in pixels) exceeds a threshold, an alternate form of transformation, such as a six-degree-of-freedom affine transform, may be computed. The alternate transformation may include all the matching feature points, or only a subset of points in order to compute an image transformation with a smaller reprojection error.

Boosting match mechanism 420 accepts the feature points from template image 404, test image 406, symmetrical matching points between both images, and image transformation from image transform 418. Match boosting attempts to find additional matching feature points between template image 404 and test image 406. Feature points in the template image 404 that do not contain a matching feature point in test image 406 are evaluated to see if a matching feature point can be found in test image 406. Preferably every non-matching feature point is evaluated in this process. The process of finding additional matching feature points by combining the distance between feature points and the Euclidean distance of the feature point locations is referred to as boosting. The boosting of matches can be performed once or multiple times by taking the new, augmented set of matching point between template image 404 and test image 406, and re-running image transform 418. In preferred embodiments hereof, a single iteration is run such that the steps are: computing the initial image transform 418, running boosting match 420, and re-computing an updated image transform 418.

In some exemplary embodiments hereof, boosting match is performed in the coordinate system of the template image 404. Before the boosting process is performed, the image transform produced by image transform mechanism 418 is inverted, if necessary, to convert feature points in test image 406 to the coordinate system of template image 404. For each feature point FP in test image 406, the feature point is transformed into the coordinate system of template image 404, FP'. Additional matching feature points are determined by finding near-by feature points in template image 404 which have a distance to the transformed feature point FP' less than a first threshold, and a Euclidean distance to the transformed feature point location FP' less than a second threshold. Performing the boosting operation in the coordinate system of the template image 404, has a number of benefits. The template image 404 is often larger than the region in the test image 406 where the template is found. When the template image 404 is a pristine representation of the object, or the template image 404 is an artistic representation (i.e. CAD-like) of the object, the feature points in the template image 404 contain no extraneous feature points. The increased size of a template image 404, when compared to the size of test image 406, also accentuates the mismatch between the transformed feature points from test image 406. Yet another benefit of performing computations in the coordinate system of the template image 404, is familiar comparison methods, such as the cross-correlation between the template image 404 and the matching region of test image 406, can be computed.

In some other exemplary embodiments hereof, boosting match 420 may be performed in the coordinate system of the test image 406. Before the boosting process is performed, the image transform produced by image transform 418 may be inverted, if necessary, to convert feature points in template image 404 to the coordinate system of test image 406. For each feature point FP in template image 404, the feature point may be transformed into the coordinate system of test image 406, FP'. Additional matching feature points are determined by finding near-by feature points in test image 406 which have a distance to the transformed feature point FP' less than a first threshold, and a Euclidean distance to the transformed feature point location FP' less than a second threshold. Performing the boosting operation in the coordinate system of the test image 406, has a number of benefits. The matching region of the template in the test image 404 is usually much smaller than the size of the template image 404. As a result, the threshold values are usually small, less than one pixel, and are more intuitive than threshold settings applied to a template image.

The matching points after boosting match 420, or after symmetrical matching 416, are input into match decision-making mechanism 422. If the number of matching points exceeds a first threshold, and optionally the reprojection error is below a second threshold, the test image 406 is labeled as containing at least one version of the template image 404. The pass/fail value of the first threshold can be specific to the type of template image 404 used. In preferred embodiments hereof, there may be a default value for the first threshold value, but this value can be overridden on a per-template image basis. When the number of matching points does not exceed the first threshold, but exceeds a minimum threshold, the boosting steps consisting of image transform 418 and boosting match 420 can be re-run. Re-running these steps may be performed in an attempt to find a better image transform between the template image 404 and test image 406, a smaller reprojection error, and an increase in the number of matching points between the template image 404 and test image 406. In preferred embodiments hereof, if the number of matching points decreases, the latest boosting step may be discarded in favor of the previous values. Further, the image transform with the lowest reprojection error may be retained, even if the associated boosted match point results is discarded.

In some separate embodiments hereof, the boosting match 420 may be performed in the coordinate system of the template image 404. Unlike the previous step where the feature points from the test image 406 are converted into the coordinate system of template image 404, the test image 406 itself is transformed into an alternate coordinate system, via image rectification. The alternate coordinate system can be arbitrary, but useful coordinate systems include the coordinate system of the template image 404, or a coordinate system where the feature points (and edges) of the template image 404 and the test image 406 are not aligned with the x-axis or the y-axis. In the preferred embodiment hereof, the coordinate system chosen is that of the template image 404. Once the transformed test image 406 is computed, a new set of feature points are extracted and analyzed from the transformed image using feature point extraction 410, matcher 414, and symmetrical matching 416. The symmetrical matching 416 will often find additional matching feature points because the template image 404, and modified test image 406 should overlap closely in location and scale. The image transform 418 and boosting match 420 can now be run to improve the number of matching points before using match decision making mechanism 422.

When matching is performed on the rectified image, the matching points found in the rectified version of the test image 110 are transformed back into the original coordinate system of the test image 110. It is possible that some of the feature points found in the rectified version of test image 110, and matched to template image 105, may be new feature points in test image 110 (i.e. they did not exist when feature points were computed on test image 110).

Application of Techniques

The framework, system, techniques and mechanisms described herein have general applicability. However, in a presently preferred implementation the template images comprise logos and the like corresponding to products (e.g., goods and services) related to certain companies or other entities.

As used herein a logo refers to any symbol, image, text, or other design, or combination thereof, adopted or used by an entity to identify its products, goods, services, etc.

In some cases the system may use multiple versions of the same logo (e.g., at different sizes).

In operation multiple test images in one or more input streams are processed with respect to multiple logos from multiple entities.

Template images found in a test image may be used to provide targeted advertising.

Computing

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

Figure 5:
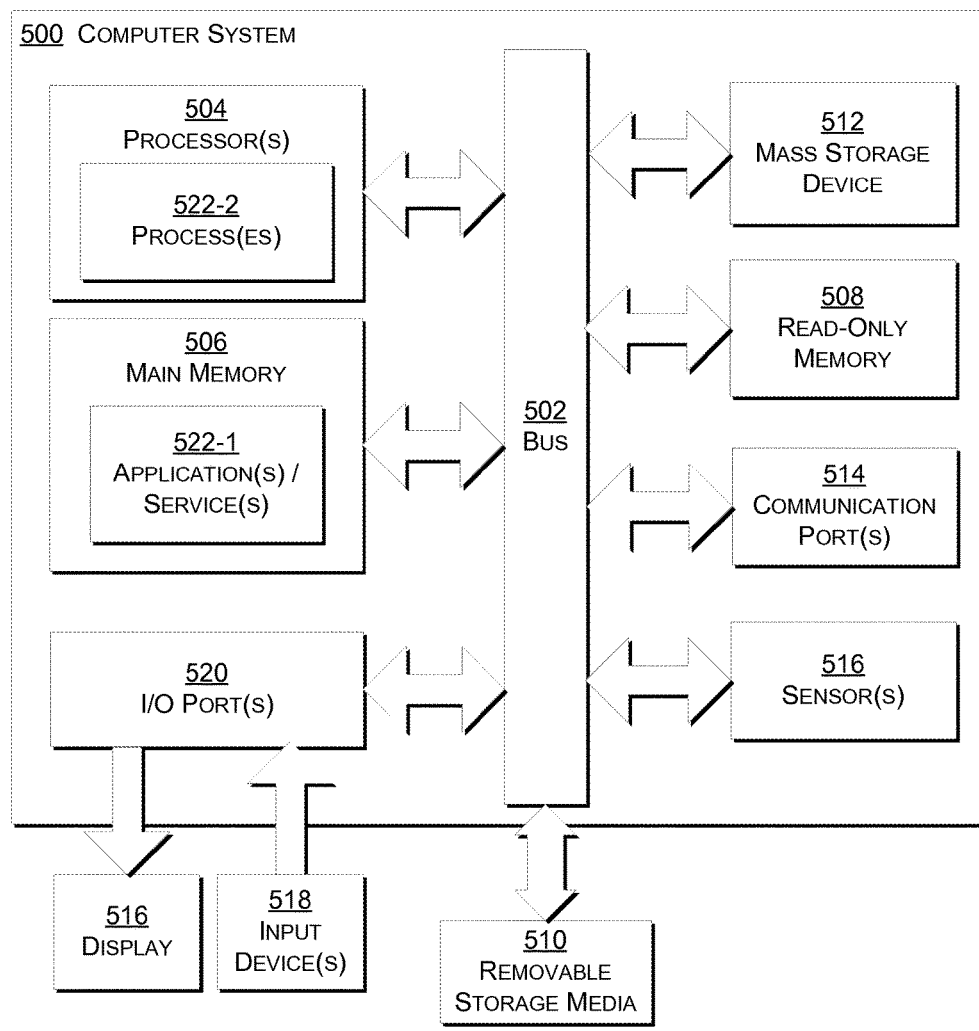
FIG. 5 is a schematic diagram of a computer system.

FIG. 5 is a schematic diagram of a computer system 500 upon which embodiments of the present disclosure may be implemented and carried out.

According to the present example, the computer system 500 includes a bus 502 (i.e., interconnect), one or more processors 504, one or more communications ports 514, a main memory 506, removable storage media 510, read-only memory 508, and a mass storage 512. Communication port(s) 514 may be connected to one or more networks by way of which the computer system 500 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 504 can be (or include) any known processor, such as, but not limited to, an Intel® Itanium® or Itanium 2® processor(s), AMD® Opteron® or Athlon MP® processor(s), or Motorola® lines of processors, and the like. Processor(s) 504 may include specialized graphics processing units (GPUs) which may be standalone or included on graphics cards or the like.

Communications port(s) 514 can be any of an RS-232 port for use with a modem based dial-up connection, a 10/100 Ethernet port, a Gigabit port using copper or fiber, or a USB port, and the like. Communications port(s) 514 may be chosen depending on a network such as a Local Area Network (LAN), a Wide Area Network (WAN), a CDN, or any network to which the computer system 500 connects. The computer system 500 may be in communication with peripheral devices (e.g., display screen 516, input device(s) 518) via Input/Output (I/O) port 520. Some or all of the peripheral devices may be integrated into the computer system 500, and the input device(s) 518 may be integrated into the display screen 516 (e.g., in the case of a touch screen).

Main memory 506 can be Random Access Memory (RAM), or any other dynamic storage device(s) commonly known in the art. Read-only memory 508 can be any static storage device(s) such as Programmable Read-Only Memory (PROM) chips for storing static information such as instructions for processor(s) 504. Mass storage 512 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 502 communicatively couples processor(s) 504 with the other memory, storage and communications blocks. Bus 502 can be a PCI/PCI-X, SCSI, a Universal Serial Bus (USB) based system bus (or other) depending on the storage devices used, and the like. Removable storage media 510 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 506 is encoded with application(s) 522 that support(s) the functionality as discussed herein (an application 522 may be an application that provides some or all of the functionality of one or more of the mechanisms described herein). Application(s) 522 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 504 accesses main memory 506 via the use of bus 502 in order to launch, run, execute, interpret or otherwise perform the logic instructions of the application(s) 522. Execution of application(s) 522 produces processing functionality of the service(s) or mechanism(s) related to the application(s). In other words, the process(es) 524 represents one or more portions of the application(s) 522 performing within or upon the processor(s) 504 in the computer system 500.

It should be noted that, in addition to the process(es) 524 that carries(carry) out operations as discussed herein, other embodiments herein include the application 522 itself (i.e., the un-executed or non-performing logic instructions and/or data). The application 522 may be stored on a computer readable medium (e.g., a repository) such as a disk or in an optical medium. According to other embodiments, the application 522 can also be stored in a memory type system such as in firmware, read only memory (ROM), or, as in this example, as executable code within the main memory 506 (e.g., within Random Access Memory or RAM). For example, application 522 may also be stored in removable storage media 510, read-only memory 508, and/or mass storage device 512.

Those skilled in the art will understand that the computer system 500 can include other processes and/or software and hardware components, such as an operating system that controls allocation and use of hardware resources.

Embodiments herein may be provided as a computer program product, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

Those skilled in the art will understand that the computer system 700 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of skill in the art will appreciate that the process may operate without any user intervention. In another embodiment, the process includes some human intervention (e.g., a step is performed by or with the assistance of a human).

Real Time

Those of ordinary skill in the art will realize and understand, upon reading this description, that, as used herein, the term "real time" means near real time or sufficiently real time. It should be appreciated that there are inherent delays in network-based and computer communication (e.g., based on network traffic and distances), and these delays may cause delays in data reaching various components Inherent delays in the system do not change the real-time nature of the data. In some cases, the term "real-time data" may refer to data obtained in sufficient time to make the data useful for its intended purpose. Although the term "real time" may be used here, it should be appreciated that the system is not limited by this term or by how much time is actually taken to perform any particular process. In some cases, real time computation may refer to an online computation, i.e., a computation that produces its answer(s) as data arrive, and generally keeps up with continuously arriving data. The term "online" computation is compared to an "offline" or "batch" computation.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, whether in the written description or the claims, "plurality" means two or more.

As used herein, whether in the written description or the claims, the terms "comprising", "including", "having", "containing", "involving", and the like are to be understood to be open-ended, that is, to mean including but not limited to. Only the transitional phrases "consisting of" and "consisting essentially of", respectively, are closed or semi-closed transitional phrases with respect to claims.

As used herein, "and/or" means that the listed items are alternatives, but the alternatives also include any combination of the listed items.

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the terms "first", "second", "third," and so on, if used in the claims, are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering. Specifically, use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The foregoing is merely illustrative and not limiting, having been presented by way of example only. Although examples have been shown and described, it will be apparent to those having ordinary skill in the art that changes, modifications, and/or alterations may be made.

Thus is provided a framework for finding template images in test or target images, in including boosting the number of matching points to improve match quality.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A computer-implemented method of determining whether an object depicted in a first image is located within a second image, the method being; implemented by computer hardware in combination with software, and the method comprising:
(A) determining a set of candidate matching feature points from a first set of feature points associated with a first image depicting an object and a second set of feature points associated with a second image, wherein:
at least some feature points among the first set of feature points are determined before receiving the second image based on a subset of layers of a convolutional neural network having a plurality of layers, and
at least some feature points among the first set of feature points are translation or rotation invariant;
(B) selectively producing a transformed image by transforming one of: (i) at least part of said first image into a coordinate system corresponding to said second image, or (ii) at least part of said second image into a coordinate system corresponding to said first image, said transforming being based on a relationship of said candidate matching feature points;
(C) boosting said set of candidate matching feature points to include additional candidate feature points associated with said first image and said second image, said boosting being based on (i) said candidate matching feature points and (ii) said transformed image; and
(D) determining, after boosting said set of candidate matching feature points, whether said portion of said object is located within said second image based on a resulting boosted set of candidate matching feature points.

2. The method of claim 1 wherein the determining in (A) eliminates at least some actual matching feature points and wherein the boosting in (C) reestablished at least one of the at least some actual matching feature points that were eliminated in (A).

3. The method of claim 1 wherein said first set of feature points was determined from multiple versions of said first image.

4. The method of claim 1 further comprising:
(E) repeating act (B) after said determining in (D), when said determining in (D) does not determine that said portion of said first image is located within said second image.

5. The method of claim 4 further comprising:
repeating act (D) after act (E).

6. The method of claim 1 wherein said determining of said set of candidate matching feature points in (A) comprises:
(A)(1) attempting to match feature points in said first set of feature points with feature points in said second set of feature points to determine a first set of matching feature points; and
(A)(2) attempting to match feature points in said second set of feature points with feature points in said first set of feature points to determine a second set of matching feature points.

7. The method of claim 6 wherein said determining of said set of candidate matching feature points in (A) further comprises, upon completion of acts (A)(1) and (A)(2):
(A)(3) determining said set of candidate matching feature points as feature points that are common to both said first set of matching feature points and said second set of matching feature points.

8. The method of claim 1 wherein said acts (B)-(C) are selectively performed based on a size of the set of candidate matching feature points determined in (A).

9. The method of claim 1 wherein the boosting in (C) is also based on (iii) said first set of feature points associated with said first image, and (iv) said second set of feature points associated with said second image.

10. The method of claim 1 wherein said first image is a template image and wherein said second image is a test image.

11. The method of claim 10 comprising:
repeating the method for multiple template images and multiple test images concurrently on multiple computing devices, wherein the multiple test images are received in a stream, and where determining whether the object is located in the second image comprises determining a location of the object in pixel coordinates of the second image.

12. The method of claim 10 wherein said template image is associated with a particular entity and wherein said determining in (D) is used to provided targeted advertising on behalf of said particular entity.

13. The method of claim 1, wherein: said boosting in (C) is performed in the coordinate system of the first image, and wherein the selectively producing a transformed image in (B) comprises: (B)(1) converting feature points associated with said second image to the coordinate system of the first image; and (B)(2) for each transformed feature point associated with said first second searching for at least one feature point associated with the first image that has a distance to the transformed feature point of less than a first threshold and a two-dimensional Euclidian distance to the transformed feature point of less than a second threshold.

14. The method of claim 1, wherein boosting comprises steps for boosting a number of matching points.

15. The method of claim 1, wherein selectively producing a transformed image comprises;
selecting a subset of the set of candidate matching feature points based on correspondence of the subset to both the first image and the second image;
determining a transformation matrix based on the subset of the set of candidate matching feature points; and
transforming the first image with the transformation matrix.

16. The method of claim 15, wherein:
correspondence of the subset to both the first image and the second image is determined based on two measures of distance in two different spaces.

17. A computer-implemented method of determining whether an object depicted in a first image is located within a second image, the method being implemented by hardware in combination with software, and the method comprising:
(A) determining a set of candidate matching feature points from a first set of feature points associated with a first image depicting an object and a second set of feature points associated with a second image, wherein:
at least some feature points among the first set of feature points are determined before receiving the second image based on a subset of layers of a convolutional neural network having a plurality of layers, and
at least some feature points among the first set of feature points are translation or rotation invariant;
(B) selectively producing a transformed image by transforming one of: (i) at least part of said first image into a first different coordinate system, or (ii) at least part of said second image into a second different coordinate, said transforming being based on a relationship of said candidate matching feature points; and
(C) boosting said set of candidate matching feature points to include additional candidate feature points associated with said first image and said second image, said boosting being based on (i) said candidate matching feature points and (ii) said transformed image; and
(D) determining, after boosting said set of candidate matching feature points, whether said object is located within said second image based on a resulting boosted set candidate matching feature points.

18. The method of claim 17 wherein, when said first different coordinate system is the coordinate system of said second image.

19. The method of claim 17 wherein, when said second different coordinate system is the coordinate system of said first image.

20. A computer-implemented method of determining whether an object depicted in a first image is located within a second image; the method being implemented by hardware in combination with software, and the method comprising:
(A) determining a set of candidate matching feature points from a first set of feature points associated with a first image and a second set of feature points associated with a second image, wherein:
at least some feature points among the first set of feature points are determined before receiving the second image based on a subset of layers of a convolutional neural network having a plurality of layers; and
at least some feature points among the first set of feature points are translation or rotation invariant;
(B) selectively transforming one of: (i) at least part of said set of candidate matching feature points into a first different coordinate system, or (ii) at least part of said second set of feature points into a second different coordinate, said transforming being based on a relationship of said candidate matching feature points; and
(C) boosting said set of candidate matching feature points to include additional candidate feature points associated with said first image and said second image, said boosting being based on (i) said candidate matching feature points and (ii) said transformed image; and
(D) determining, after boosting said set of candidate matching feature points, whether said object is located within said second image based on a resulting boosted set of candidate matching feature points.

21. The method of claim 20 wherein, when said first different coordinate system is the coordinate system of said second image.

22. The method of claim 20 wherein, when said second different coordinate system is the coordinate system of said first image.

23. The method of claim 20 wherein the determining in (A) eliminates at least some actual matching feature points and wherein the boosting in (C) reestablished at least one of the at least some actual matching feature points that were eliminated in (A).

24. The method of claim 20 wherein said first set of feature points was determined from multiple versions of said first image.

25. The method of claim 20 further comprising:
(E) repeating act (B) after said determining in (D), when said determining in (D) does not determine that said portion of said first image is located within said second image.

26. The method of claim 25 further comprising:
repeating act (D) after act (E).

27. The method of claim 20 wherein said determining of said set of candidate matching feature points in (A) comprises:

(A)(1) attempting to match feature points in said first set of feature points with feature points in said second set of feature points to determine a first set of matching feature points; and (A)(2) attempting to match feature points in said second set of feature points with feature points in said first set of feature points to determine a second set of matching feature points.

28. The method of claim 27 wherein said determining of said set of candidate matching feature points in (A) further comprises, upon completion of acts (A)(1) and (A)(2):

(A)(3) determining said set of candidate matching feature points as feature points that are common to both said first set of matching feature points and said second set of matching feature points.

29. The method of claim 20 wherein said acts (B)-(C) are selectively performed based on a size of the set of candidate matching feature points determined in (A).

30. The method of claim 20 wherein the attempting to boost in (C) is also based on (iii) said first set of feature points associated with said first image, and (iv) said second set of feature points associated with said second image.

31. The method of claim 20 wherein said first image is a template image and wherein said second image is a test image.

32. The method of claim 31 comprising:

repeating the method for multiple template images and multiple test images.

33. The method of claim 20 wherein said template image is associated with a particular entity and wherein said determining in (D) is used to provided targeted advertising on behalf of said particular entity.

34. The method of claim 20 wherein the template image represents a brand logo.

* * * * *